United States Patent
Lee et al.

(10) Patent No.: US 12,037,435 B2
(45) Date of Patent: Jul. 16, 2024

(54) METHOD FOR PREPARING CONJUGATED DIENE-BASED POLYMER AND METHOD FOR PREPARING GRAFT COPOLYMER COMPRISING THE SAME

(71) Applicant: LG CHEM, LTD., Seoul (KR)

(72) Inventors: Jin Hyoung Lee, Daejeon (KR); Young Min Kim, Daejeon (KR); Su Jeong Han, Daejeon (KR); Yoo Vin Kim, Daejeon (KR); Young Hwan Jeong, Daejeon (KR); Jae Min Suk, Daejeon (KR); Chang Hong Bak, Daejeon (KR); Jae Won Heo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 868 days.

(21) Appl. No.: 17/051,517

(22) PCT Filed: Sep. 17, 2019

(86) PCT No.: PCT/KR2019/011985
§ 371 (c)(1),
(2) Date: Oct. 29, 2020

(87) PCT Pub. No.: WO2020/060147
PCT Pub. Date: Mar. 26, 2020

(65) Prior Publication Data
US 2021/0221935 A1   Jul. 22, 2021

(30) Foreign Application Priority Data

Sep. 18, 2018 (KR) .................. 10-2018-0111802
Sep. 16, 2019 (KR) .................. 10-2019-0113658

(51) Int. Cl.
| C08F 279/04 | (2006.01) |
| C08F 2/26 | (2006.01) |
| C08F 36/06 | (2006.01) |
| C08F 136/06 | (2006.01) |
| C08K 5/098 | (2006.01) |
| C08L 55/02 | (2006.01) |

(52) U.S. Cl.
CPC ............. *C08F 279/04* (2013.01); *C08F 2/26* (2013.01); *C08F 36/06* (2013.01); *C08K 5/098* (2013.01)

(58) Field of Classification Search
CPC ....... C08F 279/04; C08F 136/06; C08L 55/02
See application file for complete search history.

(56) References Cited

U.S. PATENT DOCUMENTS 3,794,604 A * 2/1974 Throckmorton et al. ............... C08F 36/04
502/154
5,910,534 A 6/1999 Ostrowicki et al.
6,130,288 A 10/2000 Inoue et al.
6,838,534 B2 * 1/2005 Laubry ................. C08F 136/04
502/108
2007/0123657 A1 5/2007 Chai
2018/0340035 A1 11/2018 Lee et al.
2018/0362750 A1 12/2018 Lee et al.
2019/0016841 A1 1/2019 Han
2019/0023894 A1 1/2019 Han et al.

FOREIGN PATENT DOCUMENTS

| CN | 1944525 A | 4/2007 |
| CN | 108368189 A | 8/2018 |
| CN | 108473636 A | 8/2018 |
| EP | 3248994 A1 | 11/2017 |
| EP | 3363819 A1 | 8/2018 |
| JP | H1067808 A | 3/1998 |
| JP | 3817738 B2 | 9/2006 |
| JP | 2011042727 A | 3/2011 |
| KR | 10-2003-0056031 A | 7/2003 |
| KR | 10-2006-0119255 A | 11/2006 |
| KR | 10-2007-0047072 A | 5/2007 |
| KR | 10-1223295 B1 | 1/2013 |
| KR | 10-2013-0087664 A | 8/2013 |
| KR | 10-2018-0047747 A | 5/2018 |
| KR | 10-2018-0047748 A | 5/2018 |
| KR | 10-2018-0047750 A | 5/2018 |
| KR | 10-2018-0047751 A | 5/2018 |
| KR | 20180050064 A | 5/2018 |
| WO | WO9610587 A1 | 4/1996 |

OTHER PUBLICATIONS

Database WPI, Week 201840, Thomson Scientific, London, GB; AN 2018-399203, XP002804649, May 14, 2018.
Extended European Search Report for related application EP 19862296.1, mailed Nov. 15, 2021.
Fang Pu et al., "Preparation of St/BA/EHA Emulsion Using Disodium Nonylphenol Polyoxyethylene Monoester Sulfoitaconate as Emulsifier," Journal of Qingdao University of Science and Technology (Natural Science Edition), 2014, vol. 35, No. 6, pp. 567-571.
Pierre Hoerner et al., "Emulsification of poly(ethylene glycol) in thermoplastic elastomers by using polybutadiene-block-poly(ethylene oxide) diblock copolymers as stabilisers. Determination of the liquid phase mobility by pulsed field gradient NMR," Macromolecular Chemistry and Physics, 1998, 199(3), 343-352.

* cited by examiner

*Primary Examiner* — Caixia Lu

(57) ABSTRACT

The present invention relates to a method for preparing a conjugated diene-based polymer, which includes a step of preparing a conjugated diene-based polymer by initiating and carrying out polymerization while continuously adding conjugated diene-based monomers to a reactor, and in which an emulsifier is dividedly added before the initiation of the polymerization and when a polymerization conversion rate of 31% to 80% is reached. More particularly, the present invention relates to: a method for preparing a conjugated diene-based polymer and a method for preparing a graft copolymer including the method for preparing a conjugated diene-based polymer, by which a total usage amount of an emulsifier can be reduced.

13 Claims, No Drawings

METHOD FOR PREPARING CONJUGATED DIENE-BASED POLYMER AND METHOD FOR PREPARING GRAFT COPOLYMER COMPRISING THE SAME

CROSS-REFERENCE TO RELATED APPLICATION

This application is a National Phase of International Application No. PCT/KR2019/011985, filed on Sep. 17, 2019, which claims priority to and the benefit of Korean Patent Application No. 10-2018-0111802, filed on Sep. 18, 2018, and Korean Patent Application No. 10-2019-0113658, filed on Sep. 16, 2019, the disclosures of which are incorporated herein by reference in their entirety.

TECHNICAL FIELD

The present invention relates to a method for preparing a conjugated diene-based polymer and a method for preparing a graft copolymer including the same, and more particularly, to a method for preparing a conjugated diene-based polymer with improved thermal stability and improved appearance quality, and a method for preparing a graft copolymer including the same

BACKGROUND ART

Conjugated diene-based polymers exemplified by butadiene polymers have excellent rubber properties, so they are widely used as an impact modifier for various thermoplastic copolymers such as acrylonitrile-butadiene-styrene (ABS) graft copolymers and methacrylate-butadiene-styrene (MBS) graft copolymers.

ABS graft copolymers prepared using a conjugated diene-based polymer are widely used as a material for electrical appliances, electronic products, automotive parts, general office supplies, and the like, and in addition to properties thereof such as impact resistance and the like, appearance characteristics thereof such as color, gloss, and the like have emerged as important quality issues.

ABS graft copolymers are prepared by graft-polymerizing styrene and acrylonitrile to a butadiene polymer by emulsion polymerization, and depending on the area of application, are coextruded with a styrene-acrylonitrile (SAN) copolymer and thereby processed into a thermoplastic resin composition.

Although such a thermoplastic resin composition has improved impact strength due to the ABS graft copolymer, on the other hand, since the butadiene polymer included in the ABS graft copolymer contains various additives such as an emulsifier, an initiator, a molecular-weight regulator, and the like which generate a gas when the composition is molded to produce a molded article, a molded article having poor surface properties is obtained.

DISCLOSURE

Technical Problem

The present invention is directed to providing: a method for preparing a conjugated diene-based polymer, by which an amount of an emulsifier added during polymerization can be reduced; and a method for preparing a graft copolymer.

The present invention is also directed to providing: a method for preparing a conjugated diene-based polymer, by which an amount of an acid added during enlargement can be reduced: and a method for preparing a graft copolymer.

In addition, the present invention is directed to providing a method for preparing a conjugated diene-based polymer, by which an amount of gas generation from additives during the molding of a thermoplastic resin composition containing a graft copolymer can be reduced and thereby a thermoplastic resin molded article having both improved appearance quality and improved thermal stability can be produced.

Technical Solution

In order to achieve the above-described objectives, one aspect of the present invention provides a method for preparing a conjugated diene-based polymer, which includes a step of preparing a conjugated diene-based polymer by initiating and carrying out polymerization while continuously adding conjugated diene-based monomers to a reactor, and in which an emulsifier is dividedly added before the initiation of polymerization and when a polymerization conversion rate of 31 to 80% is reached.

In addition, another aspect of the present invention provides a method for preparing a graft copolymer, which includes the steps of: preparing a conjugated diene-based polymer according to the above-described preparation method: and graft-polymerizing an aromatic vinyl-based monomer and a vinyl cyan-based monomer to the conjugated diene-based polymer.

Advantageous Effects

According to the method for preparing a conjugated diene-based polymer and the method for preparing a graft copolymer of the present invention, since an addition amount of an emulsifier during polymerization can be reduced, the amount of an emulsifier remaining in the conjugated diene-based copolymer and in the graft copolymer can also be reduced. In addition, since the addition amount of an emulsifier during polymerization is significantly reduced, the addition amount of an acid during the enlargement of the conjugated diene-based polymer can also be reduced. Accordingly, a thermoplastic resin composition which contains a graft copolymer prepared using the conjugated diene-based polymer of the present invention contains a significantly reduced amount of a residual emulsifier and a residual acid, resulting in significantly reduced gas generation from the emulsifier and the acid during the molding of the composition and because of this, the thermoplastic resin composition can be produced into a thermoplastic resin molded article with excellent appearance quality and excellent thermal stability.

BEST MODE

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

In the present invention, a polymerization conversion rate may refer to a degree to which monomers are polymerized to form a polymer, and may be calculated by the following equation.

Polymerization conversion rate (%)={(Amount of monomers involved in reaction)/(Total amount of monomers added until final stage of reaction)}×100

In the present invention, an average particle diameter of a conjugated diene-based polymer may be measured using a dynamic light scattering method, and more particularly, using a Nicomp 370HPL instrument (manufactured by Nicomp).

In the present specification, an average particle diameter may refer to an arithmetic average particle diameter in the particle size distribution as measured by a dynamic light scattering method, that is, an average particle diameter measured in the scattering intensity distribution.

In the present invention, an alkyl group may be one or more selected from the group consisting of a methyl group, an ethyl group, a propyl group, an n-propyl group, an isopropyl group, a butyl group, an n-butyl group, an isobutyl group, a tert-butyl group, a sec-butyl group, a 1-methylbutyl group, a 1-ethylbutyl group, a pentyl group, an n-pentyl group, an isopentyl group, a neopentyl group, a tert-pentyl group, a hexyl group, an n-hexyl group, a 1-methylpentyl group, a 2-methylpentyl group, a 4-methyl-2-pentyl group, a 3,3-dimethylbutyl group, a 2-ethylbutyl group, a heptyl group, an n-heptyl group, a 1-methylhexyl group, a cyclopentyl methyl group, a cyclohexyl methyl group, an octyl group, an n-octyl group, a tert-octyl group, a 1-methylheptyl group, a 2-ethylhexyl group, a 2-propylpentyl group, an n-nonyl group, a 2,2-dimethylheptyl group, a 1-ethylpropyl group, a 1,1-dimethylpropyl group, an isohexyl group, a 2-methylpentyl group, a 4-methylhexyl group, a 5-methylhexyl group, and a 3-methyloctan-2-yl group.

In the present invention, an alkenyl group may be one or more selected from the group consisting of a vinyl group, a 1-propenyl group, an isopropenyl group, a 1-butenyl group, a 2-butenyl group, a 3-butenyl group, a 1-pentenyl group, a 2-pentenyl group, a 3-pentenyl group, a 3-methyl-1-butenyl group, a 1,3-butadienyl group, an allyl group, a 1-phenyl-vinyl-1-yl group, a 2-phenylvinyl-1-yl group, a 2,2-diphenylvinyl-1-yl group, a 2-phenyl-2-(naphthyl-1-yl)vinyl-1-yl group, a 2,2-bis(diphenyl-1-yl)vinyl-1-yl group, a stylbenyl group, a styrenyl group, (E)-non-1-en-1-yl, (E)-non-3-en-1-ylidene, (E)-oct-2-en-1-yl, and (E)-dec-1-en-1-yl.

In the present invention, an alkylene group may refer to the alkyl group with two binding sites, that is, a divalent alkyl group.

In the present invention, an alkenylene group may refer to the alkenyl group with two binding sites, that is, a divalent alkenyl group.

In the present invention, the amount of additives such as an initiator, an emulsifier, an electrolyte, a molecular-weight regulator, and the like is expressed based on 100 parts by weight of the sum of conjugated diene-based monomers added in the method for preparing a conjugated diene-based polymer of the present invention.

1. Method for Preparing Conjugated Diene-Based Polymer

The method for preparing a conjugated diene-based polymer according to one embodiment of the present invention includes a step of preparing a conjugated diene-based polymer by initiating and carrying out polymerization while continuously adding conjugated diene-based monomers to a reactor, wherein an emulsifier is dividedly added before the initiation of polymerization and when a polymerization conversion rate of 31 to 80% is reached.

When conjugated diene-based monomers are continuously added to a reactor, since the rapid progress of the reaction, which is a problem occurring when conjugated diene-based monomers are batch-added, can be prevented, polymerization stability and latex stability can be improved. In addition, the formation of a polymerization coagulum can be minimized. Since polymerization loss caused by the formation of a polymerization coagulum is accordingly minimized, production efficiency can be improved. In addition, since the latex stability of the conjugated diene-based polymer is improved, graft polymerization can be smoothly carried out in the preparation of a graft copolymer.

The polymerization may be initiated at 60 to 80° C. or 65 to 75° C., and is preferably initiated at 65 to 75° C. When the above-described condition is satisfied, an initiator activation temperature, a reaction rate, and reaction stability during the polymerization can be balanced.

The time point at which the continuous addition of the conjugated diene-based monomers is initiated may be the same as the time point at which the polymerization is initiated.

The continuous addition of the conjugated diene-based monomers may be carried out while raising the temperature at least 5 to 20° C. or at least 7 to 15° C. from the polymerization initiation temperature, and is preferably carried out while raising the temperature at least 7 to 15° C. When the above-described condition is satisfied, the polymerization can be stably carried out while maintaining an appropriate reaction rate.

The continuous addition of the conjugated diene-based monomers to the reactor may be carried out for 6 to 14 hours or 8 to 12 hours, and is preferably carried out for 8 to 12 hours. When the above-described condition is satisfied, polymerization stability can be easily secured even when the polymerization is carried out using a reduced amount of an emulsifier compared to conventional cases.

Preferably, the conjugated diene-based monomers are continuously added at a constant rate to improve polymerization stability.

The conjugated diene-based monomer may be one or more selected from the group consisting of 1,3-butadiene, isoprene, chloroprene, and piperylene, and is preferably 1,3-butadiene.

Meanwhile, the emulsifier may be dividedly added before the initiation of polymerization and when a polymerization conversion rate of 31 to 80% is reached, and preferably before the initiation of polymerization and when a polymerization conversion rate of 34 to 78% is reached and more preferably before the initiation of polymerization and when a polymerization conversion rate of 40 to 75% is reached. When the above-described condition is satisfied, the addition amount of an emulsifier during polymerization can be significantly reduced compared to conventional cases, but emulsion polymerization can still be easily carried out, and a conjugated diene-based polymer having a desired average particle diameter can still be prepared. In addition, since the addition amount of an emulsifier is significantly reduced, the amount of an emulsifier remaining in the conjugated diene-based polymer can also be reduced. Further, since the addition amount of an emulsifier is reduced, the addition amount of an acid during the enlargement of the conjugated diene-based polymer can also be reduced. Accordingly, when a thermoplastic resin composition containing a graft copolymer prepared using the conjugated diene-based polymer is molded, since the amount of gas generation from the emulsifier and the acid is significantly reduced, a molded article having excellent surface properties can be produced.

When the emulsifier is not added under the above-described conditions, it is difficult to secure the stability of the conjugated diene-based polymer during polymerization and enlargement processes. In addition, when the emulsifier is added only before the initiation of polymerization but not at the above-described time point, it is difficult to secure the stability of the conjugated diene-based polymer during polymerization and enlargement processes.

Meanwhile, before the initiation of polymerization, the emulsifier may be added in an amount of 0.1 to 2.5 parts by weight or 0.3 to 2 parts by weight based on 100 parts by weight of the conjugated diene-based monomers, and is preferably added in an amount of 0.3 to 2 parts by weight. When the above-described range is satisfied, since emulsion polymerization can be easily carried out even with a reduced amount of an emulsifier compared to conventional cases, when a thermoplastic resin composition containing a graft copolymer is molded, the amount of gas generation from the emulsifier is significantly reduced, and therefore, a molded article having significantly improved appearance quality can be obtained.

When a polymerization conversion rate of 31 to 80% is reached, the emulsifier may be added in an amount of 0.05 to 0.4 part by weight or 0.08 to 0.35 part by weight based on 100 parts by weight of the conjugated diene-based monomers, and is preferably added in an amount of 0.08 to 0.35 part by weight. When the above-described range is satisfied, since emulsion polymerization can be easily carried out even with a reduced amount of an emulsifier compared to conventional cases, when a thermoplastic resin composition containing a graft copolymer is molded, the amount of gas generation from the emulsifier is significantly reduced, and therefore, a molded article having significantly improved appearance quality can be obtained.

The time point at which a polymerization conversion rate of 31 to 80% is reached may be a time point during the continuous addition of the conjugated diene-based monomers or a time point after the continuous addition of the conjugated diene-based monomers is completed.

The emulsifier may include one or more selected from the group consisting of a salt of a compound represented by Chemical Formula 1, a saponified fatty acid, potassium oleate, sodium dicyclohexyl sulfosuccinate, sodium dihexyl sulfosuccinate, sodium di-2-ethylhexyl sulfosuccinate, potassium di-2-ethylhexyl sulfosuccinate, sodium dioctyl sulfosuccinate, sodium dodecyl sulfate, sodium dodecylbenzene sulfate, sodium octadecyl sulfate, sodium oleic sulfate, potassium octadecyl sulfate, potassium rosinate, and sodium rosinate, and is preferably one or more selected from the group consisting of a salt of a compound represented by Chemical Formula 1, a saponified fatty acid, and potassium oleate:

<Chemical Formula 1>

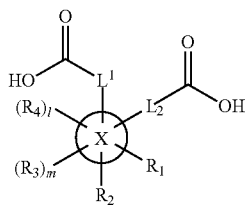

In Chemical Formula 1,

X is a $C_1$-$C_{20}$ tetravalent or higher aliphatic hydrocarbon with or without an unsaturated bond, $R_1$ to $R_4$, which are the same or different from each other, are each independently hydrogen, a $C_1$-$C_{20}$ monovalent aliphatic hydrocarbon, or *-$L_3$-COOH, $L_1$ to $L_3$, which are the same or different from each other, are each independently a direct bond or a $C_1$-$C_{20}$ divalent aliphatic hydrocarbon, and l and m, which are the same or different from each other, are each independently 0 to 6.

When the emulsifier includes one or more salts of the compound represented by Chemical Formula 1, the vaporization temperature of the emulsifier may be significantly higher than that of a conventional emulsifier. Accordingly, when a thermoplastic resin composition containing a graft copolymer prepared using the conjugated diene-based polymer of the present invention is molded, since the amount of gas generation from the emulsifier is significantly reduced, a molded article having excellent appearance quality can be produced. In addition, since a salt of the compound represented by Chemical Formula 1 includes two or more carboxylates, even with a small addition amount thereof, emulsion polymerization can be easily carried out.

In Chemical Formula 1, X may be a $C_1$-$C_{20}$ tetravalent or higher aliphatic hydrocarbon with or without an unsaturated bond.

In Chemical Formula 1, a total carbon number may be 30 to 50 or 35 to 45 and is preferably 30 to 45. When the above-described condition is satisfied, emulsion polymerization can be easily carried out even with a reduced amount of an emulsifier compared to conventional cases. In addition, since a salt of a compound represented by Chemical Formula 1 is not easily decomposed or gasified at a high temperature, when a thermoplastic resin composition containing a graft copolymer is molded, the amount of gas generation from the emulsifier is significantly reduced, and therefore, a molded article having significantly improved appearance quality can be obtained.

The emulsifier may include a salt of one or more selected from the group consisting of compounds represented by Chemical Formula 2 to Chemical Formula 4:

<Chemical Formula 2>

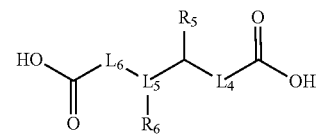

<Chemical Formula 3>

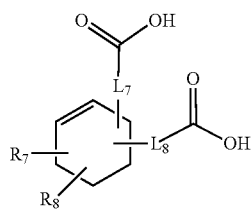

<Chemical Formula 4>

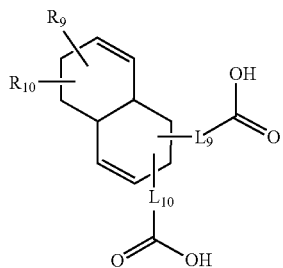

In Chemical Formula 2 to Chemical Formula 4, $L_4$ to $L_{10}$, which are the same or different from each other, are each independently a direct bond, a $C_1$-$C_{15}$ linear or branched alkylene group, or a $C_2$-$C_{15}$ linear or branched alkenylene group, provided that $L_5$ is not a direct bond, and $R_5$ to $R_{10}$, which are the same or different from each other, are each independently a $C_1$-$C_{15}$ linear or branched alkyl group or a $C_2$-$C_{15}$ linear or branched alkenyl group.

Here, the direct bond means that a bond was formed without $L_4$ and $L_6$ to $L_{10}$ being present.

The emulsifier may include a salt of one or more selected from the group consisting of compounds represented by Chemical Formula 5 to Chemical Formula 10:

<Chemical Formula 5>

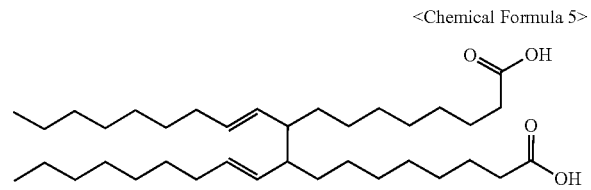

<Chemical Formula 6>

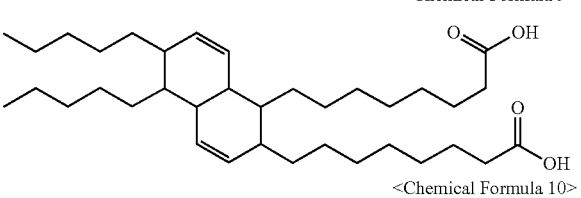

<Chemical Formula 7>

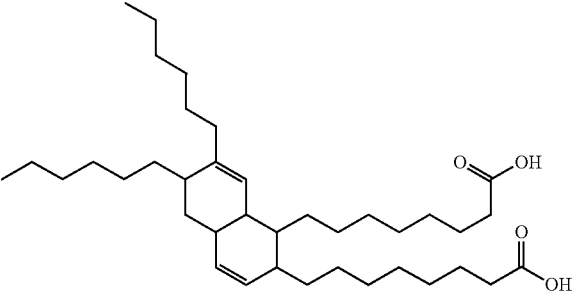

<Chemical Formula 8>

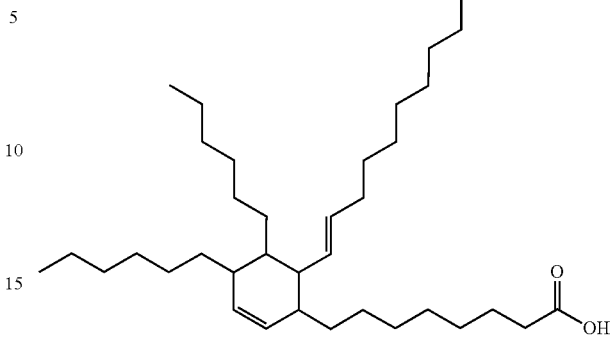

<Chemical Formula 9>

<Chemical Formula 10>

The compound represented by Chemical Formula 1 may be prepared through the multimerization of a linear or branched unsaturated fatty acid. The compound represented by Chemical Formula 1 may be prepared in the form of a mixture of two or more compounds including an unsaturated fatty acid monomer, a derivative of the compound represented by Chemical Formula 1, and the like.

The linear or branched unsaturated fatty acid may be one or more selected from the group consisting of 3-octenoic acid, 10-undecenoic acid, linoleic acid, elaidic acid, palmitoleic acid, stearic acid, tall oil fatty acids, soybean oil fatty acids, palm oil fatty acids, beef fatty acids, pork fatty acids, duck fatty acids, rice bran oil fatty acids, and linseed oil fatty acids.

The salt of the compound represented by Chemical Formula 1 may be an alkali metal salt of the compound represented by Chemical Formula 1, and is preferably a sodium salt or potassium salt of the compound represented by Chemical Formula 1.

The salt of the compound represented by Chemical Formula 1 may be prepared by adding an alkali metal to the compound represented by Chemical Formula 1 and thereby substituting a hydrogen of a carboxylic acid with the alkali metal, specifically sodium or potassium. When the compound represented by Chemical Formula 1 is prepared in the form of a mixture, the salt thereof may be prepared by adding an alkali metal to the mixture and thereby substituting a hydrogen of a carboxylic acid with the alkali metal, specifically sodium or potassium.

When the emulsifier includes a salt of the compound represented by Chemical Formula 1, it may include, in addition to the salt of the compound represented by Chemical Formula 1, one or more selected from the group consisting of by-products formed in the preparation of the compound represented by Chemical Formula 1, unreacted monomers, and alkali metal salts thereof.

As the emulsifier, one or more selected from the group consisting of commercially available products, FS200 (manufactured by LG Household & Health Care Ltd.), FS300 (manufactured by LG Household & Health Care Ltd.), and FS020 (manufactured by LG Household & Health Care Ltd.), may be used, and it/they may be used in combination with one or more saponification products selected from the group consisting of oleic acid and stearic acid.

Meanwhile, before the initiation of polymerization, one or more selected from the group consisting of an initiator, an oxidation-reduction catalyst, an electrolyte, a molecular-weight regulator, and water may be further added to the reactor in addition to the above-described emulsifier.

The initiator may be one or more selected from the group consisting of potassium persulfate, sodium persulfate, ammonium persulfate, cumene hydroperoxide, diisopropyl benzene hydroperoxide, azobis(isobutyronitrile), t-butyl hydroperoxide, p-menthane hydroperoxide, and benzoyl peroxide, and is preferably one or more selected from the group consisting of potassium persulfate and t-butyl hydroperoxide.

The initiator may be added in an amount of 0.01 to 1 part by weight or 0.05 to 0.5 part by weight based on 100 parts by weight of the conjugated diene-based monomers, and is preferably added in an amount of 0.05 to 0.5 part by weight. When the above-described condition is satisfied, the polymerization rate and polymerization stability can be balanced.

The oxidation-reduction catalyst may be one or more selected from the group consisting of sodium formaldehyde sulfoxylate, sodium ethylenediaminetetraacetate, ferrous sulfate, dextrose, sodium pyrophosphate, anhydrous sodium pyrophosphate, and sodium sulfate, and is preferably one or more selected from the group consisting of ferrous sulfate, dextrose, and sodium pyrophosphate.

The oxidation-reduction catalyst may be added in an amount of 0.001 to 1 part by weight or 0.01 to 0.5 part by weight based on 100 parts by weight of the sum of the conjugated diene-based polymer, the aromatic vinyl-based monomer, and the vinyl cyan-based monomer, and is preferably added in an amount of 0.01 to 0.5 part by weight. When all of ferrous sulfate, dextrose, and sodium pyrophosphate are added as the oxidation-reduction catalyst, it is preferred that ferrous sulfate, dextrose, and sodium pyrophosphate are respectively added in an amount of 0.0001 to 0.002 part by weight, 0.01 to 0.3 part by weight, 0.01 to 0.3 part by weight based on 100 parts by weight of the sum of the conjugated diene-based polymer, the aromatic vinyl-based monomer, and the vinyl cyan-based monomer. When the above-described range is satisfied, a polymerization conversion rate can be further increased.

The electrolyte may be one or more selected from the group consisting of $KCl$, $NaCl$, $KOH$, $KHCO_3$, $NaHCO_3$, $K_2CO_3$, $Na_2CO_3$, $KHSO_3$, $NaHSO_3$, $KAP_2O_7$, $Na+P_2O_7$, $K_3PO_4$, $Na_3PO_4$, $K_2HPO_4$, and $Na_2HPO_4$, and is preferably one or more selected from the group consisting of $KOH$ and $K_2CO_3$.

The electrolyte may be added in an amount of 0.01 to 1 part by weight or 0.05 to 0.5 part by weight based on 100 parts by weight of the conjugated diene-based monomers, and is preferably added in an amount of 0.05 to 0.5 part by weight. When the above-described condition is satisfied, a conjugated diene-based polymer having a desired average particle diameter can be prepared.

The molecular-weight regulator may be one or more selected from the group consisting of an α-methyl styrene dimer, t-dodecyl mercaptan, n-dodecyl mercaptan, octyl mercaptan, carbon tetrachloride, methylene chloride, methylene bromide, tetraethylthiuram disulfide, dipentamethylene thiuram disulfide, and diisopropyl xanthogen disulfide, and is preferably t-dodecyl mercaptan.

The molecular-weight regulator may be added in an amount of 0.01 to 1 part by weight or 0.05 to 0.8 part by weight based on 100 parts by weight of the conjugated diene-based monomers, and is preferably added in an amount of 0.05 to 0.8 part by weight. When the above-described condition is satisfied, there is an advantage that impact resistance is improved.

The molecular-weight regulator may be additionally added when a polymerization conversion rate of 20 to 40% or 25 to 35% is reached, and it is preferred that the molecular-weight regulator is additionally added when a polymerization conversion rate of 25 to 35% is reached. When the above-described condition is satisfied, both a polymerization rate and a gel content of the conjugated diene-based polymer can be easily controlled.

The molecular-weight regulator may be added in an amount of 0.5 part by weight or less or 0.01 to 0.5 part by weight based on 100 parts by weight of the conjugated diene-based monomers, and is preferably added in an amount of 0.01 to 0.5 part by weight. When the above-described condition is satisfied, an appropriate polymerization rate can be maintained.

The water may be ion-exchanged water.

Meanwhile, the method for preparing a conjugated diene-based polymer according to one embodiment of the present invention may further include a step of batch-adding conjugated diene-based monomers to the reactor before the initiation of polymerization.

The amount of the batch-added conjugated diene-based monomers may be 35% or less based on the total weight of the conjugated diene-based monomers added in the method for preparing a conjugated diene-based polymer.

In addition, the batch-added conjugated diene-based monomers and the continuously added conjugated diene-based monomers may be in a weight ratio of 1:99 to 35:65 or 5:95 to 30:70 and is preferably in a weight ratio of 5:95 to 30:70. When the above-described condition is satisfied, since the usage amount of the emulsifier can be more significantly reduced but excellent polymerization stability can still be maintained during the preparation of a conjugated diene-based polymer, the quality of a graft copolymer can be improved. In addition, since the amount of the conjugated diene-based monomers added before the initiation of polymerization is relatively small, the phenomenon that polymerization is rapidly progressed from an initial stage can be prevented. Therefore, the polymerization can be stably carried out even with a reduced addition amount of an emulsifier.

The conjugated diene-based polymer may have an average particle diameter of 0.07 to 0.2 μm or 0.08 to 0.15 μm and preferably 0.08 to 0.15 μm. When the above-described condition is satisfied, there is an advantage that the efficiency and stability of a polymerization reaction are excellent, and at the same time, an enlargement step to be described below can be easily carried out.

Meanwhile, the method for preparing a conjugated diene-based polymer according to one embodiment of the present invention may further include a step of enlarging the conjugated diene-based polymer.

The step of enlarging the conjugated diene-based polymer may be carried out using an acid such as acetic acid or phosphoric acid, in which case, the addition of the acid to the conjugated diene-based polymer causes particles to be fused to one another to form a conjugated diene-based polymer having a large particle diameter. Since the enlargement of the conjugated diene-based polymer takes less time than increasing the average particle diameter of the conjugated diene-based polymer by polymerization, production efficiency can be increased.

The acid may be added in an amount of 0.5 to 1.1 parts by weight or 0.6 to 1 part by weight based on 100 parts by weight of the conjugated diene-based monomers, and is preferably added in an amount of 0.6 to 1 part by weight. When the above-described condition is satisfied, a conjugated diene-based polymer having a large particle diameter can be easily prepared, and latex stability can be improved. In addition, when a thermoplastic resin composition containing a graft copolymer prepared using the conjugated diene-based polymer is molded, since the amount of gas generation from the acid is significantly reduced, a thermoplastic resin molded article having excellent surface properties can be produced.

The enlarged conjugated diene-based polymer may have an average particle diameter of 0.25 to 0.4 μm or 0.28 to 0.35 μm and preferably 0.28 to 0.35 μm. When the above-described range is satisfied, the impact resistance of a graft copolymer can be improved.

2. Method for Preparing Graft Copolymer

The graft copolymer according to another embodiment of the present invention includes the steps of: preparing a conjugated diene-based polymer according to the preparation method according to one embodiment of the present invention: and graft-polymerizing an aromatic vinyl-based monomer and a vinyl cyan-based monomer to the conjugated diene-based polymer.

The conjugated diene-based polymer may be in the form of latex dispersed in a colloidal state in water.

The conjugated diene-based polymer may be added in an amount of 45 to 75 wt % or 50 to 70 wt % based on the total weight of the conjugated diene-based polymer, the aromatic vinyl-based monomer, and the vinyl cyan-based monomer, and is preferably added in an amount of 50 to 70 wt %. When the above-described range is satisfied, the impact resistance and processability of a graft copolymer can be improved.

The aromatic vinyl-based monomer may be one or more selected from the group consisting of styrene, α-methylstyrene, α-ethylstyrene, and p-methylstyrene, and is preferably styrene.

The aromatic vinyl-based monomer may be added in an amount of 15 to 45 wt % or 20 to 40 wt % based on the total weight of the conjugated diene-based polymer, the aromatic vinyl-based monomer, and the vinyl cyan-based monomer, and is preferably added in an amount of 20 to 40 wt %. When the above-described range is satisfied, the chemical resistance, rigidity, impact resistance, processability, and surface gloss characteristics of a thermoplastic resin composition can be improved.

The vinyl cyan-based monomer may be one or more selected from the group consisting of acrylonitrile, methacrylonitrile, phenyl acrylonitrile, and α-chloroacrylonitrile, and is preferably acrylonitrile.

The vinyl cyan-based monomer may be added in an amount of 1 to 20 wt % or 3 to 17 wt % based on the total weight of the conjugated diene-based polymer, the aromatic vinyl-based monomer, and the vinyl cyan-based monomer, and is preferably added in an amount of 3 to 17 wt %. When the above-described range is satisfied, the chemical resistance, rigidity, impact resistance, processability, and surface gloss characteristics of a thermoplastic resin composition can be improved.

The polymerization may be carried out in the presence of one or more selected from the group consisting of an emulsifier, an initiator, an oxidation-reduction catalyst, a molecular-weight regulator, and ion-exchanged water.

The emulsifier may include a salt of the compound represented by Chemical Formula 1.

The emulsifier may be added in an amount of 0.01 to 1.0 part by weight or 0.1 to 0.6 part by weight based on 100 parts by weight of the sum of the conjugated diene-based polymer, the aromatic vinyl-based monomer, and the vinyl cyan-based monomer, and is preferably added in an amount of 0.1 to 0.6 part by weight. When the above-described range is satisfied, emulsion polymerization can be easily carried out, and at the same time, the residual amount of the emulsifier in a graft copolymer can be minimized.

Types of the initiator have been described above, and among those listed, t-butyl hydroperoxide is preferred.

The initiator may be added in an amount of 0.01 to 1 part by weight or 0.1 to 0.5 part by weight based on 100 parts by weight of the sum of the conjugated diene-based polymer, the aromatic vinyl-based monomer, and the vinyl cyan-based monomer, and is preferably added in an amount of 0.1 to 0.5 part by weight. When the above-described range is satisfied, emulsion polymerization can be easily carried out, and at the same time, the residual amount of the initiator in a graft copolymer can be minimized.

Types of the oxidation-reduction catalyst have been described above, and among those listed, one or more selected from the group consisting of ferrous sulfate, dextrose, and sodium pyrophosphate are preferred.

The oxidation-reduction catalyst may be added in an amount of 0.01 to 0.5 part by weight or 0.05 to 0.3 part by weight based on 100 parts by weight of the sum of the conjugated diene-based polymer, the aromatic vinyl-based monomer, and the vinyl cyan-based monomer, and is preferably added in an amount of 0.05 to 0.3 part by weight. When the above-described range is satisfied, a polymerization conversion rate can be further increased.

Types of the molecular-weight regulator have been described above.

The molecular-weight regulator may be added in an amount of 0.01 to 1.0 part by weight or 0.05 to 0.5 part by weight based on 100 parts by weight of the sum of the conjugated diene-based polymer, the aromatic vinyl-based monomer, and the vinyl cyan-based monomer, and is preferably added in an amount of 0.05 to 0.5 part by weight. When the above-described range is satisfied, it is possible to control a shell to have an appropriate weight-average molecular weight.

3. Thermoplastic Resin Composition

The thermoplastic resin composition according to still another embodiment of the present invention contains: the graft copolymer prepared according to another embodiment of the present invention: and a matrix copolymer including a unit derived from an aromatic vinyl-based monomer and a unit derived from a vinyl cyan-based monomer.

The matrix copolymer can impart heat resistance, rigidity, and processability to the thermoplastic resin composition.

The unit derived from an aromatic vinyl-based monomer may be a unit derived from one or more selected from the group consisting of styrene, α-methylstyrene, α-ethylstyrene, and p-methylstyrene, and is preferably a unit derived from styrene.

The unit derived from a vinyl cyan-based monomer may be a unit derived from one or more selected from the group consisting of acrylonitrile, methacrylonitrile, phenyl acrylonitrile, and α-chloroacrylonitrile, and is preferably a unit derived from acrylonitrile.

The matrix copolymer may include the unit derived from an aromatic vinyl-based monomer and the unit derived from a vinyl cyan-based monomer in a weight ratio of 85:15 to 60:40 or 80:20 to 65:35 and preferably in a weight ratio of 80:20 to 65:35. When the above-described range is satisfied, a higher level of balance among the heat resistance, impact resistance, and processability of the thermoplastic resin composition can be realized.

The graft copolymer and the matrix copolymer may be in a weight ratio of 15:85 to 35:65 or 20:80 to 30:70 and preferably in a weight ratio of 20:80 to 30:70. When the above-described range is satisfied, the chemical resistance, impact resistance, thermal stability, colorability, fatigue resistance, rigidity, and processability of a molded article formed of the thermoplastic resin composition can be improved.

A molded article formed of the thermoplastic resin composition according to still another embodiment of the present invention may have a gas generation amount of 2,000 ppm or less and a reflection haze of 1.3 or less, and preferably has a gas generation amount of 1,500 ppm or less and a reflection haze of 1.2 or less. When the above-described condition is satisfied, a thermoplastic resin molded article having excellent surface properties can be produced.

Hereinafter, exemplary embodiments of the present invention will be described in detail so that those of ordinary skill in the art can easily carry out the present invention. However, it should be understood that the present invention can be implemented in various forms and that the exemplary embodiments are not intended to limit the present invention thereto.

Example 1

<Preparation of Conjugated Diene-Based Polymer>

To a nitrogen-substituted polymerization reactor, 90 parts by weight of ion-exchanged water, 10 parts by weight of 1,3-butadiene, 1 part by weight of FS300 (manufactured by LG Household & Health Care Ltd.) as an emulsifier, 0.35 part by weight of potassium carbonate ($K_2CO_3$) as an electrolyte, 0.1 part by weight of t-dodecyl mercaptan as a molecular-weight regulator, 0.1 part by weight of potassium persulfate as a polymerization initiator were batch-added. After raising the temperature of the reactor to 69° C., polymerization was initiated.

The polymerization was continued while continuously adding 90 parts by weight of 1,3-butadiene at a constant rate for 10 hours from the same time point as the initiation of polymerization. The continuous addition was carried out while raising the temperature to 78° C. at a constant rate.

Meanwhile, 0.1 part by weight of t-dodecyl mercaptan was batch-added when a polymerization conversion rate of 30% was reached.

After the continuous addition of 1,3-butadiene was completed (i.e., a time point at which a polymerization conversion rate of 74% was reached), 0.1 part by weight of FS300 (manufactured by LG Household & Health Care Ltd.) was batch-added as an emulsifier, and the polymerization was continued for 15 hours and then terminated, and thereby a conjugated diene-based polymer having a small particle diameter was prepared.

The conjugated diene-based polymer having a small particle diameter was enlarged by adding an aqueous solution containing 0.8 part by weight of acetic acid thereto, and thereby a conjugated diene-based polymer having a large particle diameter was prepared.

<Preparation of Graft Copolymer>

To a nitrogen-substituted polymerization reactor, 60 parts by weight (based on a solid content) of the conjugated diene-based polymer having a large particle diameter and 1,000 parts by weight of ion-exchanged water were added. Subsequently, polymerization was carried out while continuously adding, to the polymerization reactor at 70° C. for 3 hours at a constant rate, each one of a first mixture consisting of 12 parts by weight of acrylonitrile, 28 parts by weight of styrene, 20 parts by weight of ion-exchanged water, 0.4 part by weight of FS300 (manufactured by LG Household & Health Care Ltd.) as an emulsifier, 0.35 part by weight of t-dodecyl mercaptan as a molecular-weight regulator and a second mixture containing 0.12 part by weight of t-butyl hydroperoxide, 0.054 part by weight of dextrose, 0.004 part by weight of sodium pyrophosphate, and 0.002 part by weight of ferrous sulfate, which had been prepared in separate mixing apparatuses.

After the continuous addition was completed, 0.05 part by weight of dextrose, 0.03 part by weight of sodium pyrophosphate, 0.001 part by weight of ferrous sulfate, and 0.05 part by weight of t-butyl hydroperoxide were batch-added to the polymerization reactor, the temperature of the polymerization reactor was raised to 80° C. at a constant rate over 1 hour, and then polymerization was terminated, and thereby a graft copolymer was prepared.

After the prepared graft copolymer latex was coagulated by adding 1 part by weight of $MgSO_4$ thereto, it was washed, dehydrated, and dried, and thereby a graft copolymer powder was prepared.

<Preparation of Thermoplastic Resin Composition>

A thermoplastic resin composition was prepared by mixing 27 parts by weight of the graft copolymer powder and 73 parts by weight of a SAN copolymer (92HR manufactured by LG Chem).

Example 2

A conjugated diene-based polymer, a graft copolymer, and a thermoplastic resin composition were prepared in the same manner as in Example 1 except that, in the preparation of the conjugated diene-based polymer, 0.1 part by weight of FS300 (manufactured by LG Household & Health Care Ltd.) was batch-added as an emulsifier when a polymerization conversion rate of 59% was reached, and the polymerization was continued for 15 hours and then terminated.

Example 3

A conjugated diene-based polymer, a graft copolymer, and a thermoplastic resin composition were prepared in the same manner as in Example 1 except that, in the preparation of the conjugated diene-based polymer, 0.1 part by weight of FS300 (manufactured by LG Household & Health Care Ltd.) was batch-added as an emulsifier when a polymerization conversion rate of 41% was reached, and the polymerization was continued for 15 hours and then terminated.

Example 4

A conjugated diene-based polymer, a graft copolymer, and a thermoplastic resin composition were prepared in the same manner as in Example 1 except that, in the preparation of the conjugated diene-based polymer, 0.1 part by weight of FS300 (manufactured by LG Household & Health Care Ltd.) was batch-added as an emulsifier when a polymerization conversion rate of 34% was reached, and the polymerization was continued for 15 hours and then terminated.

Example 5

A conjugated diene-based polymer, a graft copolymer, and a thermoplastic resin composition were prepared in the same manner as in Example 1 except that, in the preparation of the conjugated diene-based polymer, 0.08 part by weight of FS300 (manufactured by LG Household & Health Care Ltd.) was batch-added as an emulsifier when a polymerization conversion rate of 78% was reached, and the polymerization was continued for 15 hours and then terminated.

Example 6

A conjugated diene-based polymer, a graft copolymer, and a thermoplastic resin composition were prepared in the same manner as in Example 1 except that, in the preparation of the conjugated diene-based polymer, 35 parts by weight of 1,3-butadiene was batch-added before the initiation of polymerization, 65 parts by weight of 1,3-butadiene was continuously added at a constant rate for 10 hours from the same time point as the initiation of polymerization, 0.1 part by weight of FS300 (manufactured by LG Household & Health Care Ltd.) was batch-added as an emulsifier when a polymerization conversion rate of 58% was reached, and the polymerization was continued for 15 hours and then terminated.

Example 7

A conjugated diene-based polymer, a graft copolymer, and a thermoplastic resin composition were prepared in the same manner as in Example 1 except that FS020 (manufactured by LG Household & Health Care Ltd., component: a saponified fatty acid) was used as an emulsifier.

Comparative Example 1

<Preparation of Conjugated Diene-Based Polymer>

To a nitrogen-substituted polymerization reactor, 75 parts by weight of ion-exchanged water, 90 parts by weight of 1,3-butadiene, 3 parts by weight of FS300 (manufactured by LG Household & Health Care Ltd.) as an emulsifier, 0.1 part by weight of potassium carbonate ($K_2CO_3$) as an electrolyte, 0.1 part by weight of t-dodecyl mercaptan as a molecular-weight regulator, 0.15 part by weight of t-butyl hydroperoxide as a polymerization initiator, 0.06 part by weight of dextrose, 0.005 part by weight of sodium pyrophosphate, and 0.0025 part by weight of ferrous sulfate were batch-added. After raising the temperature of the reactor to 55° C., polymerization was initiated.

Subsequently, after carrying out the polymerization to a time point at which a polymerization conversion rate of 32% was reached, 0.3 part by weight of potassium persulfate was batch-added, and the temperature was raised to 72° C. After carrying out the polymerization to a time point at which a polymerization conversion rate of 68% was reached, 10 parts by weight of 1,3-butadiene was batch-added, and the polymerization was continued for 15 hours and then terminated, and thereby a conjugated diene-based polymer having a small particle diameter was prepared.

The conjugated diene-based polymer having a small particle diameter was enlarged by adding an aqueous solution containing 1.5 parts by weight of acetic acid thereto, and thereby a conjugated diene-based polymer having a large particle diameter was prepared.

<Preparation of Graft Copolymer>

A graft copolymer was prepared in the same manner as in Example 1 except that the prepared graft copolymer latex was coagulated by adding 2 parts by weight of $MgSO_4$ thereto.

<Preparation of Thermoplastic Resin Composition>

A thermoplastic resin composition was prepared in the same manner as in Example 1.

Comparative Example 2

A conjugated diene-based polymer, a graft copolymer, and a thermoplastic resin composition were prepared in the same manner as in Comparative Example 1 except that, in the preparation of the conjugated diene-based polymer, 1.5 parts by weight of FS300 (manufactured by LG Household & Health Care Ltd.) was batch-added as an emulsifier before the initiation of polymerization.

Comparative Example 3

A conjugated diene-based polymer, a graft copolymer, and a thermoplastic resin composition were prepared in the same manner as in Example 1 except that, in the preparation of the conjugated diene-based polymer, 0.1 part by weight of FS300 (manufactured by LG Household & Health Care Ltd.) was batch-added as an emulsifier when a polymerization conversion rate of 27% was reached, and the polymerization was continued for 15 hours and then terminated.

Comparative Example 4

A conjugated diene-based polymer, a graft copolymer, and a thermoplastic resin composition were prepared in the same manner as in Example 1 except that, in the preparation of the conjugated diene-based polymer, 0.1 part by weight of FS300 (manufactured by LG Household & Health Care Ltd.) was batch-added as an emulsifier when a polymerization conversion rate of 84% was reached, and the polymerization was continued for 15 hours and then terminated.

Comparative Example 5

<Preparation of Conjugated Diene-Based Polymer>

To a nitrogen-substituted polymerization reactor, 90 parts by weight of ion-exchanged water, 35 parts by weight of 1,3-butadiene, 1 part by weight of FS300 (manufactured by LG Household & Health Care Ltd.) as an emulsifier, 0.35 part by weight of potassium carbonate ($K_2CO_3$) as an electrolyte, 0.1 part by weight of t-dodecyl mercaptan as a molecular-weight regulator, and 0.1 part by weight of potassium persulfate as a polymerization initiator were batch-added. After raising the temperature of the reactor to 69° C., polymerization was initiated. When a polymerization conversion rate of 20% was reached, 65 parts by weight of 1,3-butadiene was batch-added to the reactor, and the polymerization was continued. When a polymerization conversion rate of 30% was reached, 0.1 part by weight of t-dodecyl mercaptan was batch-added, and the polymerization was continued. When a polymerization conversion rate of 60% was reached, 0.1 part by weight of FS300 (manufactured by LG Household & Health Care Ltd.) was batch-added as an emulsifier, the polymerization was continued for 15 hours and then terminated, and thereby a conjugated diene-based polymer having a small particle diameter was prepared.

The conjugated diene-based polymer having a small particle diameter was enlarged by adding an aqueous solution containing 0.8 part by weight of acetic acid thereto, and thereby a conjugated diene-based polymer having a large particle diameter was prepared.

<Preparation of Graft Copolymer>

A graft copolymer was prepared in the same manner as in Example 1 except that the obtained conjugated diene-based polymer having a large particle diameter was used.

<Preparation of Thermoplastic Resin Composition>

A thermoplastic resin composition was prepared by mixing 27 parts by weight of the graft copolymer powder and 73 parts by weight of a SAN copolymer (92HR manufactured by LG Chem).

Experimental Example 1

The properties of the conjugated diene-based polymers of Examples and Comparative Examples were determined by the methods described below, and the results are shown in Table 1 and 2.

(1) Polymerization conversion rate (%): 2 g of conjugated diene-based polymer latex was dried in a 150° C. hot-air dryer for 15 minutes and then weighed to determine a total solid content (TSC) thereof, and a polymerization conversion rate thereof was calculated according to the following equation:

Polymerization conversion rate (%)=(Total amount of initially added monomers−Total amount of unreacted monomers)/(Total amount of initially added monomers)×100

(2) Average particle diameter (μm): measured by a dynamic light scattering method using a Nicomp 370HPL instrument (manufactured by Nicomp).

(3) Polymerization coagulum of a conjugated diene-based polymer having a small particle diameter (%): The weight of a polymerization coagulum formed in a reactor and the total weight of added monomers were measured after the completion of polymerization, and the amount of the coagulum was calculated according to the following equation.

Polymerization coagulum (%)=(Weight of polymerization coagulum formed in reactor/Total weight of added monomers)×100

(4) Polymerization coagulum of a conjugated diene-based polymer having a large particle diameter (%): the weight of a polymerization coagulum formed in a reactor and the total weight of added monomers were measured after the completion of enlargement, and the amount of the coagulum was calculated according to the following equation.

Polymerization coagulum (%)=(Weight of polymerization coagulum formed in reactor/Total weight of added monomers)×100

Experimental Example 2

The properties of graft copolymer powders of Examples and Comparative Examples were determined by the methods described below, and the results are shown in Table 1 and 2.

(4) Bulk density: After placing a 100 ml container (material: stainless steel) on a scale and setting the scale to 0, a graft copolymer powder was put into the container and leveled to the height of the container by pushing the excess off, and the weight thereof was measured and used to calculate density.

Bulk density=Weight of graft copolymer powder (units: g)/Volume of graft copolymer powder (units: ml)

(5) Magnesium content in a graft copolymer powder (ppm): 0.1 g of a graft copolymer powder was wet-decomposed with sulfuric acid, nitric acid, and hydrogen peroxide and then diluted with ultrapure water to a weight of 20 g, and the magnesium content therein was analyzed by inductively coupled plasma (ICP).

Experimental Example 3

The thermoplastic resin compositions of Examples and Comparative Examples were extruded into pellets, a property thereof was determined by the following method, and the results are shown in Table 1 and 2.

(6) Gas generation amount (ppm): Using headspace gas chromatography with flame ionization detection (HS-GC/MSD), the total amount of volatile organic compounds (VOCs) generated from 1 g of a pellet at 250° C. for 1 hour was measured.

Experimental Example 4

Specimens were prepared by injection-molding the pellets prepared in Experimental Example 3, a property of the specimens was determined by the following method, and the results are shown in Table 1 and 2.

(7) Reflection haze: The reflection haze of a specimen was measured in accordance with the ASTM E430 standard test method, by adding the gloss values obtained at 17° to 19° and 21° to 23°.

TABLE 1

| Classification | | | Examples | | | | | | |
|---|---|---|---|---|---|---|---|---|---|
| | | | 1 | 2 | 3 | 4 | 5 | 6 | 7 |
| 1,3-Butadiene | First addition | Mode of addition | Batch | Batch | Batch | Batch | Batch | Batch | Batch |
| | | Addition amount (parts by weight) | 10 | 10 | 10 | 10 | 10 | 35 | 10 |
| | Second addition | Mode of addition | Continuous | Continuous | Continuous | Continuous | Continuous | Continuous | Continuous |
| | | Addition amount (parts by weight) | 90 | 90 | 90 | 90 | 90 | 65 | 90 |

TABLE 1-continued

| | Classification | | Examples | | | | | | |
|---|---|---|---|---|---|---|---|---|---|
| | | | 1 | 2 | 3 | 4 | 5 | 6 | 7 |
| Emulsifier | | Type | FS300 | FS300 | FS300 | FS300 | FS300 | FS300 | FS020 |
| | First addition | Time point of addition (polymerization conversion rate) | 0 | 0 | 0 | 0 | 0 | 0 | 0 |
| | | Addition amount (parts by weight) | 1 | 1 | 1 | 1 | 1 | 1 | 1 |
| | Second addition | Time point of addition (polymerization conversion rate) | 74 | 59 | 41 | 34 | 78 | 58 | 74 |
| | | Addition amount (parts by weight) | 0.1 | 0.1 | 0.1 | 0.1 | 0.08 | 0.1 | 0.1 |
| Conjugated diene-based polymer having small particle diameter | | Polymerization conversion rate (%) | 96 | 95 | 95 | 96 | 95 | 95 | 95 |
| | | Average particle diameter (um) | 0.125 | 0.121 | 0.115 | 0.110 | 0.122 | 0.131 | 0.119 |
| | | Polymerization coagulum (%) | 0.02 | 0.03 | 0.01 | 0.03 | 0.02 | 0.04 | 0.03 |
| Conjugated diene-based polymer having large particle diameter | | Average particle diameter (um) | 0.330 | 0.328 | 0.319 | 0.320 | 0.322 | 0.316 | 0.329 |
| | | Polymerization coagulum (%) | 0.04 | 0.03 | 0.03 | 0.02 | 0.03 | 0.04 | 0.03 |
| Graft copolymer | | Bulk density (g/ml) | 0.39 | 0.40 | 0.38 | 0.37 | 0.38 | 0.38 | 0.38 |
| | | Magnesium content (ppm) | 650 | 700 | 680 | 670 | 690 | 600 | 720 |
| Thermoplastic resin composition | | Gas generation amount (ppm) | 1,500 | 1,400 | 1,410 | 1,350 | 1,150 | 1,280 | 1,650 |
| | | Reflection haze | 0.9 | 1.0 | 1.1 | 1.0 | 1.2 | 1.0 | 1.1 |

TABLE 2

| | | | Comparative Examples | | | | |
|---|---|---|---|---|---|---|---|
| Classification | | | 1 | 2 | 3 | 4 | 5 |
| 1,3-Butadiene | First addition | Mode of addition | Batch | Batch | Batch | Batch | Batch |
| | | Addition amount (parts by weight) | 90 | 90 | 10 | 10 | 35 |
| | Second addition | Time point of addition (polymerization conversion rate) | 68 | 68 | 0 | 0 | 20 |
| | | Mode of addition | Batch | Continuous | Continuous | Continuous | Batch |
| | | Addition amount (parts by weight) | 10 | 10 | 90 | 90 | 65 |
| Emulsifier | | Type | FS300 | FS300 | FS300 | FS300 | FS300 |
| | First addition | Time point of addition (polymerization conversion rate) | 0 | 0 | 0 | 0 | 0 |
| | | Addition amount (parts by weight) | 3 | 1.5 | 1 | 1 | 1 |
| | Second addition | Time point of addition (polymerization conversion rate) | — | — | 27 | 84 | 60 |
| | | Addition amount (parts by weight) | — | — | 0.1 | 0.1 | 0.1 |
| Conjugated diene-based polymer having small particle diameter | | Polymerization conversion rate (%) | 96 | 94 | 96 | 95 | 94 |
| | | Average particle diameter (μm) | 0.122 | 0.130 | 0.081 | 0.116 | 0.129 |
| | | Polymerization coagulum (%) | Less than 0.01 | More than 0.2 | 0.03 | More than 0.1 | More than 0.2 |
| Conjugated diene-based polymer having large particle diameter | | Average particle diameter (μm) | 0.329 | 0.351 | 0.350 | 0.309 | 0.330 |
| | | Polymerization coagulum (%) | 0.02 | 0.1 | 0.3 | 0.05 | 0.1 |
| Graft copolymer | | Bulk density (g/ml) | 0.38 | 0.32 | 0.35 | 0.36 | 0.32 |
| | | Magnesium content (ppm) | 1,300 | 800 | 820 | 700 | 720 |
| Thermoplastic resin composition | | Gas generation amount (ppm) | 2,300 | 1,500 | 1,350 | 1,400 | 1,380 |
| | | Reflection haze | 1.6 | 1.5 | 1.6 | 1.4 | 1.5 |

Referring to Table 1 and 2, in the case of Examples 1 to 7, a small amount of polymerization coagulum was formed both in the conjugated diene-based polymer having a small particle diameter and the conjugated diene-based polymer having a large particle diameter. Therefore, it can be confirmed that in Examples 1 to 7, the conjugated diene-based polymers having a small particle diameter and the conjugated diene-based polymers having a large particle diameter had excellent latex stability and low polymerization loss, and had high production efficiency because a separate process for removing the polymerization coagulum was not required. In addition, from the fact that the graft copolymers of Examples 1 to 7 had a bulk density of 0.37 or more, it can be seen that excellent coagulation properties were exhibited, and since the graft copolymers did not have a relatively large volume for a given weight thereof, it can be predicted that the handling thereof will be easy. In addition, from the fact that the amount of magnesium remaining in the graft copolymers was small even when the same amount of $MgSO_4$ was used as a coagulant, it can be confirmed that excellent thermal stability was exhibited. In addition, from a small amount of gas generation in the thermoplastic resin compositions and low reflection haze, it can be confirmed that excellent appearance quality was exhibited. On the other hand, in the case of Comparative Example 1 in which 3 parts by weight of an emulsifier was added only before the initiation of polymerization, it can be seen that the graft copolymer contained a large amount of residual magnesium even though the same amount of a coagulant was used as in Examples in the preparation of a graft copolymer, and from a large amount of gas generation in the thermoplastic resin composition and high reflection haze, a degradation in appearance characteristics can be predicted.

In addition, in the case of Comparative Example 2 in which 1.5 parts by weight of an emulsifier was added only before the initiation of polymerization, an excessive amount of polymerization coagulum was formed in the conjugated diene-based polymer having a small particle diameter and in the conjugated diene-based polymer having a large particle diameter. From this result, it can be seen that in Comparative Example 2, the conjugated diene-based polymer having a small particle diameter and the conjugated diene-based polymer having a large particle diameter had low latex stability and high polymerization loss, and had reduced production efficiency because a separate process for removing the polymerization coagulum was required. In addition, from the fact that the graft copolymer had a low bulk density, it can be seen that coagulation properties were degraded, and since the graft copolymer had a relatively large volume for a given weight thereof, it can be predicted that the handling thereof will not be easy. In addition, from the fact that the amount of magnesium remaining in the graft copolymer was large even when the same amount of $MgSO_4$ was used as a coagulant, it can be confirmed that thermal stability was degraded, and from high reflection haze, it can be confirmed that appearance quality was also degraded.

In addition, in the case of Comparative Example 3 in which an emulsifier was added for the second time when a polymerization conversion rate of 27% was reached, the latex stability of the conjugated diene-based polymer having a small particle diameter was not excellent although an excessive amount of polymerization coagulum was not formed therein. Accordingly, since the latex stability of the conjugated diene-based polymer having a small particle diameter was not maintained during the enlargement process, an excessive amount of polymerization coagulum was formed in the conjugated diene-based polymer having a large particle diameter, and therefore, a separate process for removing the polymerization coagulum was required. In addition, from the high reflection haze of the thermoplastic resin composition, it can be confirmed that appearance quality was degraded.

In addition, in the case of Comparative Example 4 in which an emulsifier was added for the second time when a polymerization conversion rate of 84% was reached, since no emulsifier was added when polymerization stability decreased during the polymerization process, an excessive amount of polymerization coagulum was formed in the conjugated diene-based polymer. Accordingly, it can be seen that latex stability was degraded, polymerization loss was increased, and since a separate process for removing the polymerization coagulum was required, production efficiency was degraded. In addition, it can be seen that the average particle diameter of the conjugated diene-based polymer having a large particle diameter, which affects impact strength, slightly decreased. In addition, from the high reflection haze of the thermoplastic resin composition, it can be confirmed that appearance quality was degraded.

In addition, in the case of Comparative Example 5 in which 1,3-butadiene was batch-added when added for the second time, it can be seen that since an excessive amount of polymerization coagulum was formed in the conjugated diene-based polymer having a small particle diameter, latex stability was degraded, polymerization loss was increased, and production efficiency was degraded. In addition, even though a separate process for removing the polymerization coagulum was carried out prior to enlarging the conjugated diene-based polymer having a small particle diameter, an excessive amount of polymerization coagulum was formed in the conjugated diene-based polymer having a large particle diameter. In addition, from the fact that the graft copolymer had a low bulk density, it can be seen that coagulation properties were degraded, and since the graft copolymer had a relatively large volume for a given weight thereof, it can be predicted that the handling thereof will not be easy. In addition, from the high reflection haze of the thermoplastic resin composition, it can be confirmed that appearance quality was degraded.

The invention claimed is:

1. A method for preparing a conjugated diene-based polymer, the method comprising:

batch-adding conjugated diene-based monomers to a reactor before an initiation of polymerization; and preparing a conjugated diene-based polymer by initiating and carrying out polymerization while continuously adding conjugated diene-based monomers to the reactor, wherein an emulsifier is dividedly added before the initiation of the polymerization and when a polymerization conversion rate of 31% to 80% is reached, and wherein a weight ratio of the batch-added conjugated diene-based monomers and the continuously added conjugated diene-based monomer is 1:99 to 35:65, wherein the emulsifier includes a salt of a compound represented by Chemical Formula 1:

<Chemical Formula 1>

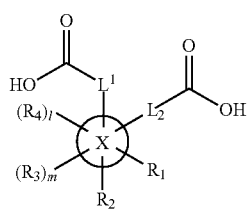

wherein, in Chemical Formula 1,

X is a $C_1$-$C_{20}$ tetravalent or higher aliphatic hydrocarbon with or without an unsaturated bond $R_1$ to $R_4$, which are the same or different from each other, are each independently hydrogen, a $C_1$-$C_{20}$ monovalent aliphatic hydrocarbon, or *-$L_3$-COOH, $L_1$ to $L_3$, which are the same or different from each other, are each independently a direct bond or a $C_1$-$C_{20}$ divalent aliphatic hydrocarbon, and l and m, which are the same or different from each other, are each independently 0 to 6.

2. The method of claim 1, wherein the emulsifier is dividedly added before the initiation of polymerization and when a polymerization conversion rate of 34% to 78% is reached.

3. The method of claim 1, wherein the emulsifier is added in an amount of 0.1 part by weight to 2.5 parts by weight based on 100 parts by weight of the conjugated diene-based monomers before the initiation of polymerization.

4. The method of claim 1, wherein the emulsifier is added in an amount of 0.05 part by weight to 0.4 part by weight based on 100 parts by weight of the conjugated diene-based monomers when a polymerization conversion rate of 31% to 80% is reached.

5. The method of claim 1, wherein the conjugated diene-based monomers are continuously added for 6 hours to 14 hours.

6. The method of claim 1, wherein the emulsifier includes a salt of one or more selected from the group consisting of compounds represented by Chemical Formula 2 to Chemical Formula 4:

<Chemical Formula 2>

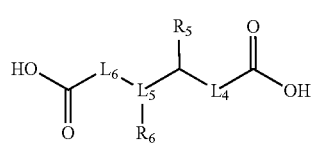

<Chemical Formula 3>

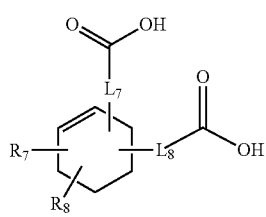

<Chemical Formula 4>

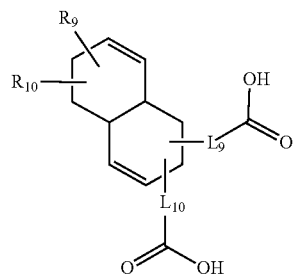

wherein, in Chemical Formula 2 to Chemical Formula 4, $L_4$ to $L_{10}$, which are the same or different from each other, are each independently a direct bond, a $C_1$-$C_{15}$ linear or branched alkylene group, or a $C_2$-$C_{15}$ linear or branched alkenylene group, provided that $L_5$ is not a direct bond, and $R_5$ to $R_{10}$, which are the same or different from each other, are each independently, a $C_1$-$C_{15}$ linear or branched alkyl group or a $C_2$-$C_{15}$ linear or branched alkenyl group.

7. The method of claim 1, wherein the emulsifier includes a salt of one or more selected from the group consisting of compounds represented by Chemical Formula 5 to Chemical Formula 10:

<Chemical Formula 5>

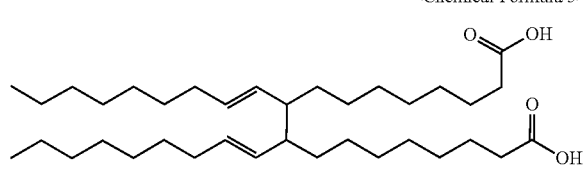

<Chemical Formula 6>

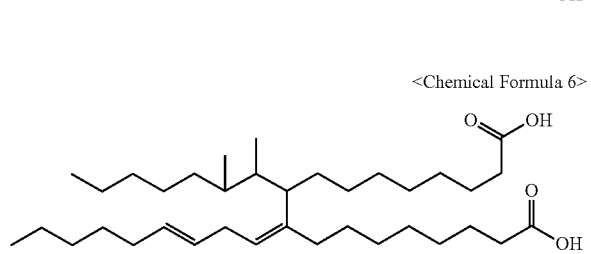

<Chemical Formula 7>

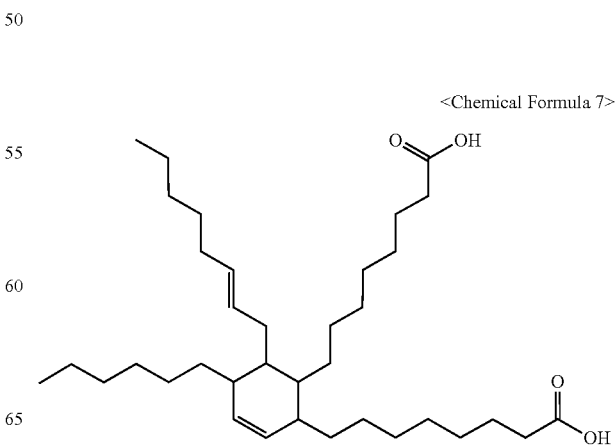

<Chemical Formula 8>

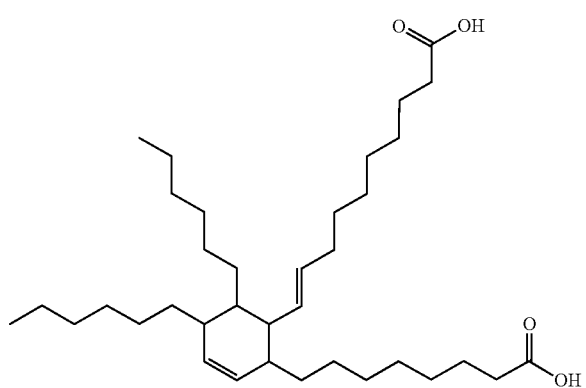

<Chemical Formula 10>

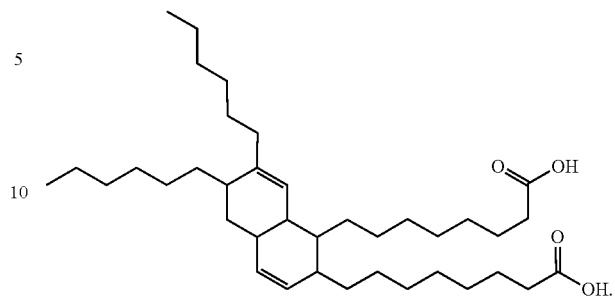

8. The method of claim 1, wherein the salt of the compound represented by Chemical Formula 1 is an alkali metal salt of the compound represented by Chemical Formula 1.

9. The method of claim 1, wherein the salt of the compound represented by Chemical Formula 1 is a sodium salt or potassium salt of the compound represented by Chemical Formula 1.

10. The method of claim 1, wherein the conjugated diene-based polymer has an average particle diameter of 0.07 μm to 0.2 μm.

11. The method of claim 1, further comprising enlarging a particle diameter of the conjugated diene-based polymer.

12. The method of claim 11, wherein, in the enlargement of the conjugated diene-based polymer, an acid is added in an amount of 0.5 part by weight to 1.1 parts by weight based on 100 parts by weight of the conjugated diene-based monomers.

13. A method for preparing a graft copolymer, the method comprising:
preparing a conjugated diene-based polymer by the method of claim 1; and
graft-polymerizing an aromatic vinyl-based monomer and a vinyl cyan-based monomer to the conjugated diene-based polymer.

<Chemical Formula 9>

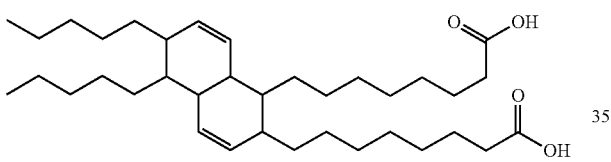

* * * * *